A. E. MILLER.
STARTING CRANK FOR AUTOMOBILES.
APPLICATION FILED DEC. 29, 1916.

1,236,588.

Patented Aug. 14, 1917.

INVENTOR
Arthur E. Miller
BY
Delbert H. Decker
ATTORNEY

UNITED STATES PATENT OFFICE.

ARTHUR E. MILLER, OF SACRAMENTO, CALIFORNIA.

STARTING-CRANK FOR AUTOMOBILES.

1,236,588.  Specification of Letters Patent.  Patented Aug. 14, 1917.

Application filed December 29, 1916. Serial No. 139,550.

*To all whom it may concern:*

Be it known that I, ARTHUR E. MILLER, a citizen of the United States residing at Sacramento, in the county of Sacramento and State of California, have invented certain new and useful Improvements in Starting-Cranks for Automobiles, of which the following is a specification.

The chief object of this invention is to so construct a crank for starting internal combustion engines, such as are used on motor vehicles, that all danger of injury to the starter's arm due to "back-firing" shall be eliminated.

Therefore the starting crank is provided with a connection between parts thereof such as will permit the part engaging the engine shaft to rotate independently of the other in the event of a "back-fire."

Figure 1:
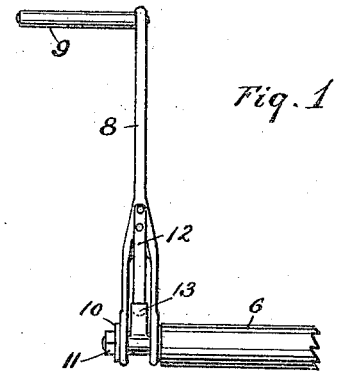
Figure 2:
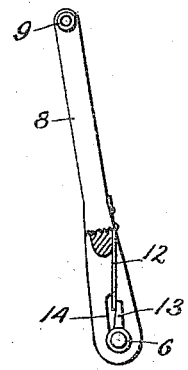
Figure 3:
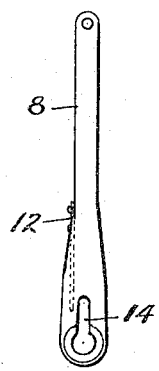

The accompanying drawings illustrate the structure whereby the object of this invention is accomplished. Therein Figure 1 is a side elevation of the preferred form of the starting crank; Fig. 2 is a front view thereof with a portion broken away; Fig. 3 is a rear view of the shank of the crank; and Fig. 4 is a modification showing a change in the relative location of essential parts.

Figure 4:
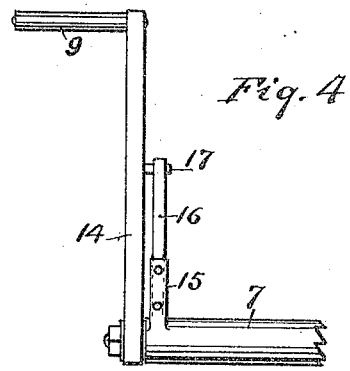

That portion of the crank by which engagement is made with the shaft of the engine is typified in Fig. 1 at 6 and in Fig. 4 at 7. It may be termed the bit and may be of any suitable form for effecting said engagement. The shank of the crank in the first three views is indicated by 8 and its handle by 9. The bit is reduced at its outer end and the shank 8 is journaled thereon, it being held in place on the reduced portion by washer 10 and nut 11. The journal end of the shank is bifurcated and into the space between the forks extends a plate spring 18 riveted or otherwise secured at its upper end to the shank. Upon the reduced portion of the bit is formed or located a lug 13 with which the free end of the spring engages. For the ready application of the shank to the bit the rear fork of the shank is provided with a slot 14 through which the lug 13 can pass.

In using the crank the spring 12 engages the radial lug 13 and is stiff enough to thereby carry the bit around in rotating the engine shaft. Should a back-fire occur the lug 13 will snap by the end of spring 12 and so permit the bit to rotate alone and not transmit the shock to the arm of the starter.

If desired the relative location of spring and lug may be reversed, the lug being located on the shank and the spring on the bit as shown in Fig. 4. In this form the shank 14 is without bifurcation and simply journaled on the reduced outer end of the bit 7. An arm 15 projects from the side of the bit and to it is riveted the spring 16 which corresponds to spring 12 in the other form. A lug 17 corresponding to lug 13 in the other form protrudes from the shank into the path of spring 16.

In this modification the operation of spring and lug is substantially the same as in the first instance, one snaps by the other under the sudden stress applied to the bit by a back-fire thereby saving the starter's arm.

The invention claimed is—

1. In a starting crank the combination of the engaging bit, a handled shank journaled thereon, a lug and a plate spring, the lug and the spring being relatively so associated with the bit and shank that the free end of the spring and the lug engage one another to effect the rotation of the bit and that one will snap by the other on the occurrence of a "back-fire".

2. In a starting crank the combination of the engaging bit provided with a radial lug, a handled shank journaled on the bit, and a spring secured to the shank by one end in position to engage said lug with its free end for the purpose specified.

3. In a starting crank the combination of the engaging bit provided with a radial lug, a bifurcated handled shank journaled on the bit and having a slot in one fork for the passage of said lug, and a spring secured to said shank and extending between the forks thereof into position for engagement with said lug as and for the purpose specified.

In testimony whereof I have affixed my signature.

ARTHUR E. MILLER.

Copies of this patent may be obtained for five cents each, by addressing the "Commissioner of Patents, Washington, D. C."